(12) United States Patent
Smithson

(10) Patent No.: US 6,211,793 B1
(45) Date of Patent: Apr. 3, 2001

(54) SAFETY BELT LOAD SENSOR

(75) Inventor: Alan Smithson, Carlisle (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/182,852

(22) Filed: Oct. 29, 1998

(51) Int. Cl.$^7$ .................................................. G08B 21/00
(52) U.S. Cl. .................... 340/665; 340/667; 340/668; 340/438; 340/457.1; 340/439; 340/461; 280/807; 280/808; 280/806; 280/801
(58) Field of Search ..................... 340/665, 667, 340/668; 180/273, 271, 268; 701/36, 45, 46; 297/483, 480, 474, 469, 477; 280/806, 807, 808, 801

(56) References Cited

U.S. PATENT DOCUMENTS

| | | | |
|---|---|---|---|
| 5,181,739 | * | 1/1993 | Bauer et al. .......................... 280/807 |
| 5,184,845 | * | 2/1993 | Omura ................................. 280/735 |
| 5,544,918 | * | 8/1996 | Fleming et al. ...................... 280/805 |
| 5,764,139 | * | 6/1998 | Nojima et al. ....................... 340/461 |
| 5,770,997 | * | 6/1998 | Kleinberg et al. ................... 340/438 |

* cited by examiner

*Primary Examiner*—Jeffery Hofsass
*Assistant Examiner*—Hung Nguyen
(74) *Attorney, Agent, or Firm*—Lonnie Drayer

(57) ABSTRACT

A load sensor for a vehicle safety belt 10 comprises means for determining an electrical characteristic of the belt 10 and control means for comparing the sensed characteristic with a reference level for the characteristic. In one embodiment, conductive fibers 26, 28 are interwoven into the belt 10 and electrical contacts 30, 32 are provided at each end thereof. Excessive loading of the belt results in a break in the fibers 26, 28 which, in turn, results in electrical discontinuity. The discontinuity is sensed by an electrical sensor and indicator means is provided to indicate to the driver of the vehicle that a belt has been excessively loaded.

16 Claims, 4 Drawing Sheets

Figure 3:
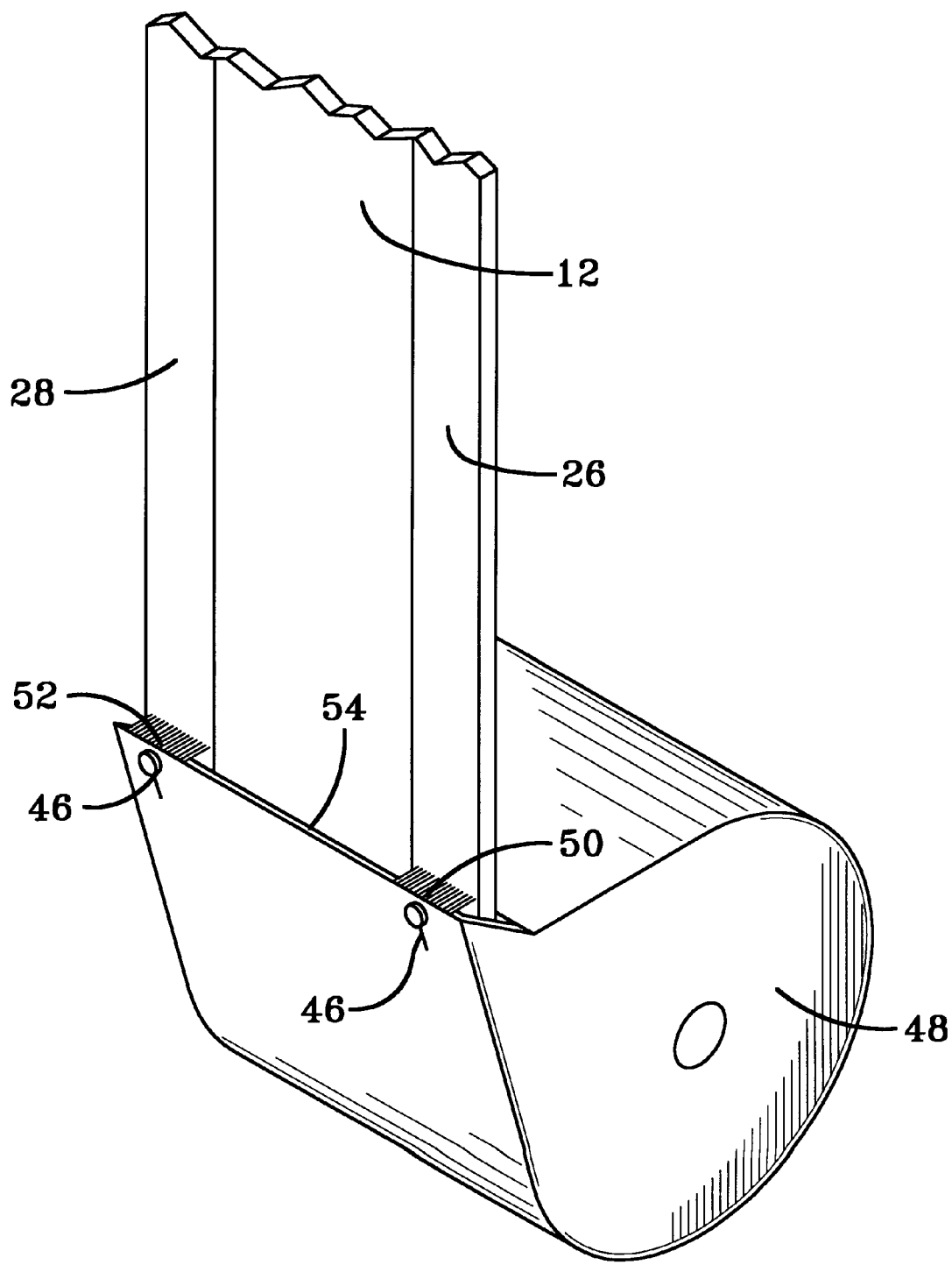

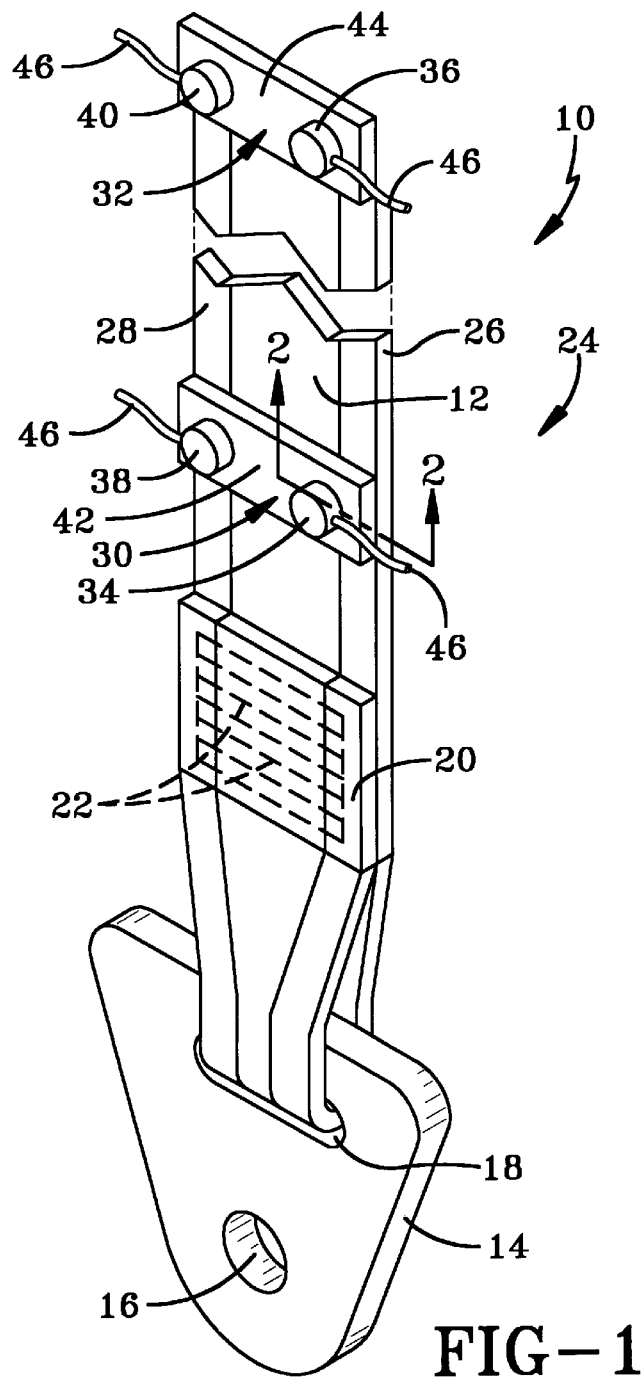
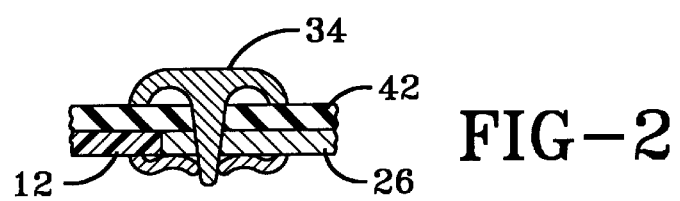
FIG-1
FIG-2

SAFETY BELT LOAD SENSOR

The present invention relates to a sensor for sensing the load applied to a vehicle safety belt and a vehicle safety belt apparatus incorporating such a sensor.

Vehicle safety belts are used in most passenger vehicles for restraining vehicle occupants and/or cargo in position in the event of hard braking or an accident. In most countries, wearing of safety belts is compulsory and most passenger vehicles are fitted with safety belts for each seat.

It is an object of the present invention to provide a sensor for sensing the load applied to vehicle safety belts.

According to one aspect of the invention there is provided a load sensor for sensing the load applied to a vehicle safety belt comprising means for determining an electrical characteristic of the belt, which characteristic is affected by loads applied to the belt and means for comparing the sensed electrical characteristic with a reference level for the characteristic.

According to another aspect of the invention, there is provided a vehicle safety belt load sensor comprising means for determining an electrical characteristic of a belt which characteristic is affected by load applied to the belt and means for comparing the sensed characteristic with a reference level.

The means for comparing the sensed characteristic with the reference level preferably comprises means for determining whether the sensed characteristic falls within a predetermined range. The sensor preferably includes means for indicating when the sensed characteristic falls outside the predetermined range.

In that way, the sensor can indicate when an excessive load has been applied to the safety belt which requires replacement of the safety belt.

The electrical characteristic of the belt may be the electrical resistance or capacitance of the belt. Alternatively, the sensor may measure the potential difference across the belt or the sensor may measure a current applied across the belt.

The sensor is preferably mounted on the belt.

According to a further aspect of the invention, there is provided a vehicle safety belt apparatus including a safety belt, a load sensor for sensing load applied to the safety belt, the sensor comprising means for determining an electrical characteristic of the belt which is affected by load applied to the belt and means for comparing the sensed characteristic with a reference level.

Preferably the means for comparing the sensor characteristic with a reference level determines whether the characteristic falls within a predetermined range.

The means for determining the electrical characteristic of the belt may comprise first and second electrical contacts on the belt, electrically connected to electrical characteristic sensing means. The first contact is preferably arranged at one end of the belt and the second contact is preferably arranged at the other end of the belt. Alternatively, where one end of the seat belt is wound on to an inertia reel and passes over a bracket above the passenger's shoulder and the other end is secured elsewhere in the vehicle, the first contact may comprise a brush contact at the mouth of the inertia reel and the second contact may comprise a contact on the aforesaid other end. In such a case, means may be provided on the inertia reel to determine the length of belt that has been pulled from the inertia reel.

Calibration means may be provided for calibrating the reference level or reference range of the electrical characteristic of the belt. Such calibration may be conducted on installation of the belt within a vehicle. Alternatively, where the brush contacts described above are used, the calibration means may calibrate the reference level of the belt each time the belt is worn by a passenger. In such a case, the calibration means may be actuated by insertion of the seat belt tongue into the catch of the seat belt anchor.

In a preferred embodiment, the seat belt includes conductive fibres which preferably extend the full length of the belt. The fibres may be interwoven with the belt webbing. The fibres may be metallic fibres or carbon fibres. Where conductive fibres are provided as part of the belt, the measured electrical characteristic will be one of electrical resistance, potential difference or current. The fibres may be arranged to break at a predetermined belt loading. In that case, the electrical continuity of the fibres will be broken and the sensor can then indicate that the belt should be replaced.

In one embodiment, conductive fibres may be provided at each edge of the belt and across one end of the belt so as to connect the fibres at each edge. In that case, the first and second contacts could be provided at the opposite end of the belt, one at each edge thereof.

As mentioned above, the apparatus may include means for indicating that the electrical characteristic falls outside a predetermined range. Preferably, the apparatus includes means to indicate that the belt has experienced an excessive load. That means may include circuitry to indicate to the driver of the vehicle that one of the belts in the vehicle has been excessively loaded and the indicating means may include a display on the instrument panel of the vehicle. Preferably, the display indicates which belt is affected.

The apparatus may include means to prevent ignition of this vehicle engine in the event that a safety belt has previously been excessively loaded. The apparatus may include means to indicate to the engine immobilizer that ignition of the engine should be prevented.

The safety belt may be a safety belt for a vehicle occupant or a restraining belt for cargo in a vehicle.

Figure 4:
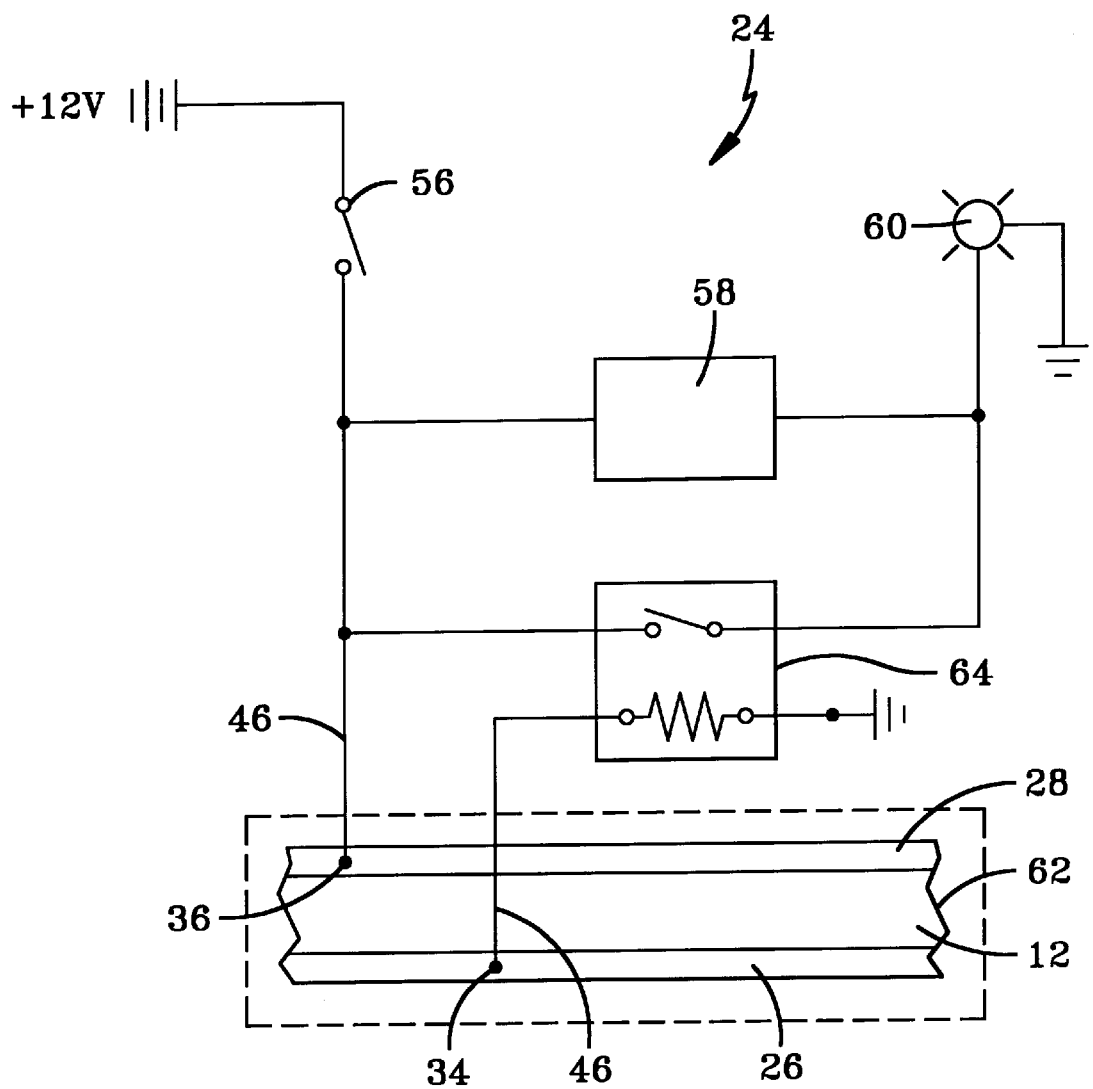
Figure 5:
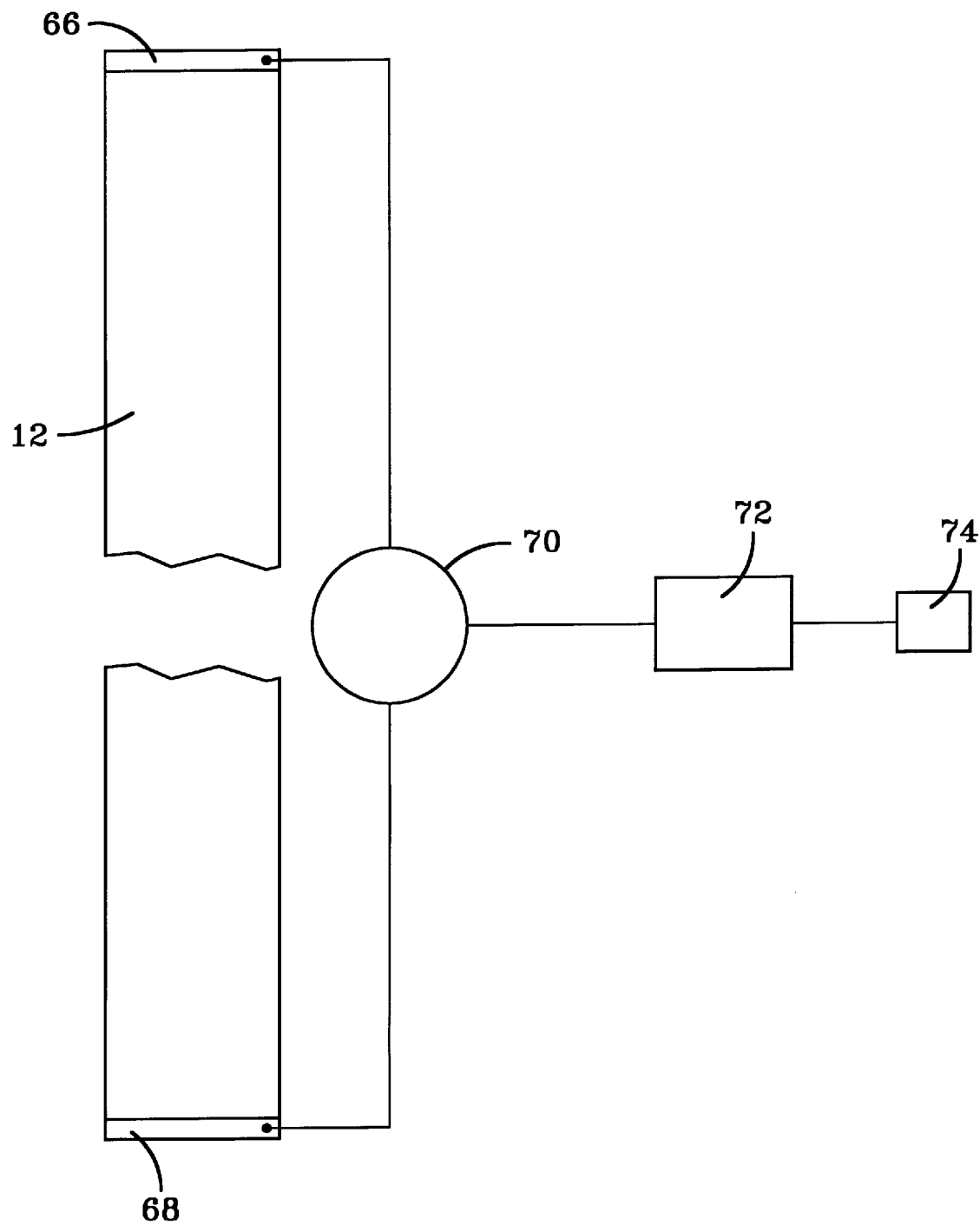

Embodiments of the invention will now be described in detail and with reference to the accompanying drawings in which:

FIG. 1 is a perspective view of a safety belt in accordance with the third aspect of the invention having a load sensor in accordance with the first and second aspects of the invention, FIG. 2 is a section through part of the belt of FIG. 1, FIG. 3 is a perspective view of part of a safety belt in accordance with the third aspect of the invention having a load sensor in accordance with the first and second aspects of the invention, FIG. 4 is a circuit diagram of a load sensor in accordance with the first and second aspects of the invention and, FIG. 5 is a schematic illustration of a safety belt in accordance with the third aspect of the invention having a load sensor in accordance with the first and second aspects of the invention.

In FIG. 1, a vehicle safety belt 10 comprises an elongate strip of flexible webbing material 12 which is secured in the vehicle by means of a bracket 14. The bracket 14 comprises an aperture 16 for receiving a bolt (not shown) for securing the bracket 14 to the vehicle and a slot 18 through which the end 20 of the belt 12 passes. The end 20 is folded back against part of the belt 12 and the belt 12 is secured against pulling out of the bracket by the end 20 being sewn to the part of the belt 12 against which it is folded back. Stitching 22 which secures the end 20 against the belt 12 is sufficiently strong to secure against loads normally experienced by vehicle safety restraint belts. A load sensor generally indicated at 24 includes a first set of conductive fibres 26 interwoven with the webbing of the belt 12 along one edge thereof and extending longitudinally of the belt, a second set of conductive fibres 28 interwoven with the webbing of the belt 12 along the other edge thereof and extending longitudinally of the belt and electrical contact members 30, 32 at opposite ends of the belt 12. Each contact member 30, 32 comprises respective first contact pins 34, 36 for contacting opposite ends of the first set of conductive fibres 26 and respective second contact pins 38, 40 for contacting opposite ends of the second set of conductive fibres 28. The respective first and second contact pins 34, 38 and 36, 40 are connected by respective straps 42, 44 of insulative material. Each contact pin is electrically connected to a control circuit by means of leads 46. FIG. 2 illustrates the connection of the contact pin 34 with the conductive fibres 26. The pin 34 extends through the strap 42 of insulative material and through the fibres 26 to form an electrical contact therewith.

FIG. 3 shows an alternative embodiment of seat belt in which the belt is wound on to an inertia reel 48. Such devices are well-known in the art of seat belt technology. In the embodiment shown in FIG. 3 the seat belt 12 is substantially similar to that shown in FIG. 1 in that it includes conductive fibres 26, 28 interwoven into the webbing of the belt 12 at each edge thereof and extending longitudinally thereof. The electrical contacts in the case of the FIG. 3 belt are made with each set of fibres by respective sets of conductive brushes 50, 52 mounted to the mouth 54 of the inertia reel 48. The brushes 50, 52 are connected to the control circuit by means of leads 46. The other end (not shown) of the belt in FIG. 3 may include a contact member 30 similar to that shown in FIG. 1.

During normal usage, seat belts are loaded under tension and there is a possibility that a seat belt may be excessively loaded when used to restrain a vehicle occupant or cargo under hard braking or in the event of an accident. In the event of hard braking or an accident the belt may be loaded excessively with the result that the belt may not perform adequately in future hard braking situations.

With the belts of FIGS. 1 and 3 the electrical characteristics of the conductive fibres 26, 28 are sensed and an excessive loading of the belt will result in a change in those electrical characteristics. In particular, it is proposed to use carbon fibre as the conductive fibres. Carbon fibre is relatively brittle in comparison to the webbing of the seat belt and in the event of excessive loading, the carbon fibres will break causing an electrical discontinuity. That discontinuity can be detected by the load sensor 24 and the excessive loading of the seat belt brought to the attention of the driver by illuminating an indicator light on the vehicle control panel. Alternatively, metal fibres could be used which may or may not break due to excessive loading, but the strain placed upon the fibres due to excessive loading of the belt will result in a change in their electrical resistance which can be detected by the load sensor 24 in the manner of a strain gauge, to determine that the belt has been excessively loaded.

In the embodiment shown in FIGS. 1 and 3, separate electrical contacts are provided for each set of conductive fibres. In that way, each edge of the belt is provided with a respective load sensor. However, it will be appreciated that as an alternative to the separate electrical contacts at the end spaced from the contact member 30, a conductive bridge piece (not shown) may be provided to link the respective sets of fibres electrically at the end spaced from the contact member 30. In that way, a single electrical circuit is provided and the load sensor 24 detects changes in the electrical characteristics of both sets of conductive fibres with one contact member 30. For example, instead of the contact member 32, a conductive strap may be attached from one set of fibres 26 to the other set 28.

FIG. 4 is a schematic illustration of an example of a circuit diagram of a load sensor 24 which may be used to determine excessive loading of seat belt 12. In FIG. 4 a power supply for example, the vehicle battery, powers the load sensor arrangement. The circuit is connected downstream of the vehicle ignition and on ignition a switch 56 is closed. On ignition, a current flows via a timer 58 and an indicator lamp 60 on the vehicle control panel to earth, illuminating the lamp 60 for a predetermined period of time in order to test the lamp. After the predetermined period of time has elapsed, the timer 58 switches the current to the control circuit of the load sensor 24. In that arrangement, the first set of conductive fibres 26 and the second set of conductive fibres 28 are linked at one end by a conductive bridge 62. The other ends of the fibres 26, 28 are connected to a contact member 30 as shown in FIG. 1. The lead 46 from the first contact pin 34 powers a relay 64. The lead 46 from the second contact pin 36 is connected via relay 64 to the lamp 60. Thus, in use, when the vehicle ignition is switched on, the lamp 60 is powered for a short time until the timer 58 switches the current to the control circuit of the load sensor 24. If the belt 12 is in an acceptable condition, then the relay 64 remains closed and the current passes to earth via the lead 46 from the contact pin 34. If the conductive fibres 26, 28 are broken due to an excessive loading of the belt 12, then the power to the relay 64 from the contact pin 34 is disconnected allowing the switch in the relay to be opened so that current can pass to the lamp 60. Thus, if the webbing of the belt 12 is not in an acceptable condition, the lamp 60 will remain on after the predetermined period of test time set by the timer 58 which will alert the driver of the vehicle to the fact that one of the seat belts is defective.

On the display panel of the vehicle dashboard, respective lamps may be provided for each seat belt and a diagram of the vehicle may be superimposed so that the driver can identify which belt is defective.

The schematic diagram shown in FIG. 5 illustrates a further embodiment of a safety belt load sensor in accordance with the invention. In that embodiment, a belt 12 has a first electrical contact 66 at one end of the belt and a second electrical contact 68 at the other end of the belt. An electrical characteristic sensor 70 is connected between the contacts 66, 68. The electrical characteristic sensor could sense the potential difference between the contacts 66, 68, the resistance between the contacts 66, 68 or the capacitance of the belt 12 between the contacts 66, 68. The sensed characteristic is measured by the sensor 70 and that data is passed to a central processing unit 72 such as a microprocessor, for example, a vehicle diagnostic computer. The microprocessor 72 records the initial value of the electrical characteristic, for example capacitance, and may define an error range around that initial value in order to provide a calibrated value of each vehicle seat belt for each journey. If the seat belt is excessively loaded, the capacitance, or other electrical characteristic, will fall outside the range set by the microprocessor 72 and the microprocessor 72 can then provide a signal to the vehicle control panel 74. In a preferred embodiment the vehicle control panel 74 is an LCD display and the microprocessor 72 indicates a message such as "SEAT BELT EXCESSIVELY LOADED—REFER TO MANUFACTURER". Alternatively, or in addition to the warning provided to the driver, the microprocessor may store details of excessive seat belt loading events such as date and time and amount of loading so that at the next vehicle service, the service engineer overhauling the vehicle is made aware of the events and is notified as to which seat belts require attention.

It will be appreciated that the present invention can be applied to any safety restraint, for example, strapping for restraining cargo in a vehicle in addition to conventional vehicle occupants' safety belts.

The advantage of the present invention is that the driver of a vehicle is made aware of a defective seat belt if a seat belt has been excessively loaded as a consequence of an accident or hard braking. Also, the system will detect damage to seat belts due to, for instance, vandalism or wear and tear.

What is claimed is:

1. A vehicle safety belt apparatus including a safety belt and a load sensor for sensing load applied to the safety belt, the sensor comprising means for determining an electrical characteristic of the belt which is affected by a load applied to the belt, said means comprising first and second electrical contacts on the belt, electrically connected to electrical characteristic sensing means, the first contact is arranged at one end of the belt and the second contact is arranged at the other end of the belt, and means for comparing the sensed characteristic with a reference level to determine whether the characteristic falls within a predetermined range.

2. A vehicle safety belt apparatus including a safety belt and a load sensor for sensing load applied to the safety belt, the sensor comprising means for determining an electrical characteristic of the belt which is affected by a load applied to the belt, said means comprising first and second electrical contacts on the belt, electrically connected to electrical characteristic sensing means, and means for comparing the sensed characteristic with a reference level to determine whether the characteristic falls within a predetermined range, one end of the belt is wound on to an inertia reel and passes over a bracket above the passenger's shoulder and the other end is secured elsewhere in the vehicle, the first contact comprising a brush contact at the mouth of the inertia reel and the second contact comprising a contact on the said other end.

3. A vehicle safety belt according to claim 2 in which means is provided on the inertia reel to determine the length of belt that has been pulled from the inertia reel.

4. A vehicle safety belt including a safety belt and a load sensor for sensing load applied to the safety belt, the sensor comprising means for determining an electrical characteristic means for determining an electrical characteristic of the belt which is affected by load applied to the belt and means for comparing the sensed characteristic with a reference level, calibration means is provided for calibrating the reference level or reference range of the electrical characteristic of the belt, the belt is wound on to an inertia reel and brush contacts are used, the calibration means calibrating the reference level of the belt each time the belt is worn by a passenger.

5. A vehicle safety belt according to claim 4 in which the seat belt includes a tongue for insertion into a catch of an anchor for the seat belt therein, the calibration means being actuated by insertion of the seat belt tongue into the catch of the seat belt anchor.

6. A vehicle safety belt including a safety belt and a load sensor for sensing load applied to the safety belt, the sensor comprising means for determining an electrical characteristic means for determining an electrical characteristic of the belt which is affected by load applied to the belt and means for comparing the sensed characteristic with a reference level, the belt including conductive fibres that extend longitudinally of the belt.

7. A vehicle safety belt according to claim 6 in which the fibres are interwoven with the belt webbing.

8. A vehicle safety belt according to claim 6 in which the fibres are metallic fibres or carbon fibres.

9. A vehicle safety belt according to claim 8 in which the measured electrical characteristic is one of electrical resistance, potential difference or current.

10. A vehicle safety belt according to claim 6 in which the fibres are arranged to break at a predetermined belt loading whereby the electrical continuity of the fibres will be interrupted.

11. A vehicle safety belt according to claim 6 in which the conductive fibres are provided at each edge of the belt and across one end of the belt so as to connect the fibres at each edge whereby the first and second contacts are provided at one end of the belt, one at each edge thereof.

12. A vehicle safety belt including a safety belt and a load sensor for sensing load applied to the safety belt, the sensor comprising means for determining an electrical characteristic means for determining an electrical characteristic of the belt which is affected by load applied to the belt and means for comparing the sensed characteristic with a reference level, the apparatus including means to indicate that the belt has experienced an excessive load.

13. A vehicle safety belt according to claim 12 in which said indicator means may include circuitry to indicate to the driver of the vehicle that one of the belts in the vehicle has been excessively loaded, the indicating means including a display on the instrument panel of the vehicle.

14. A vehicle safety belt according to claim 13 in which the display indicates which belt is affected.

15. A vehicle safety belt according to claim 12 in which the apparatus includes means to prevent ignition of the vehicle engine in the event that a safety belt has previously been excessively loaded.

16. A vehicle safety belt according to claim 12 in which the apparatus includes means to indicate to an engine immobilizer of the vehicle that ignition of the engine should be prevented.

* * * * *